United States Patent
Mora

[11] Patent Number: 5,997,145
[45] Date of Patent: Dec. 7, 1999

[54] COMPUTER SCREEN ENHANCING DEVICE

[76] Inventor: Leo L. Mora, 950 Bay St. #1, San Francisco, Calif. 94109

[21] Appl. No.: 09/265,343

[22] Filed: Mar. 9, 1999

[51] Int. Cl.$^6$ .................................................. G02B 27/00
[52] U.S. Cl. ......................... 359/609; 359/601; 359/612; 348/842
[58] Field of Search ........................... 359/408, 601–612, 359/474, 477, 804–811, 819, 817; 348/832–842

[56] References Cited

U.S. PATENT DOCUMENTS

| | | | |
|---|---|---|---|
| 3,329,771 | 7/1967 | Rose | 348/842 |
| 3,564,138 | 2/1971 | Harrold | 348/842 |
| 4,865,420 | 9/1989 | Schmidt | 359/601 |
| 5,069,529 | 12/1991 | Takahashi | 359/609 |
| 5,115,345 | 5/1992 | Hobson et al. | 359/601 |
| 5,121,253 | 6/1992 | Waintroob | 359/601 |
| 5,218,474 | 6/1993 | Kirschner | 359/601 |
| 5,243,463 | 9/1993 | Waintroob | 359/601 |
| 5,432,504 | 7/1995 | Shaw et al. | 359/601 |
| 5,717,566 | 2/1998 | Tao | 361/681 |

*Primary Examiner*—Thong Nguyen
*Attorney, Agent, or Firm*—Goldstein & Canino

[57] ABSTRACT

A computer screen enhancing device including a front panel having a central opening therethrough. The front panel is positionable on a computer monitor whereby a computer screen of the monitor is visible through the central opening. A pair of side panels are foldably secured to outer edges of a pair of side portions of the front panel. The side panels have a pair of vertically disposed hook and loop strips disposed on outer surfaces thereof. A top panel is foldably secured to an outer edge of an upper portion of the front panel. The top panel has two pairs of horizontally disposed hook and loop strips on an inner surface thereof for mating with the pair of vertically disposed hook and loop strips of the pair of side panels in a closed orientation.

6 Claims, 3 Drawing Sheets

COMPUTER SCREEN ENHANCING DEVICE

BACKGROUND OF THE INVENTION

The present invention relates to a computer screen enhancing device and more particularly pertains to enhancing images seen through the computer screen by minimizing glare.

As the advent of the computer age has changed into the computer revolution, constant improvements in the computer field are being sought out. Because more and more people are spending more time sitting in front of a computer monitor, improvements are necessary to enhance the user's ability to view the monitor with as few distractions as possible. One of the more annoying problems associated with viewing a computer monitor is the glare that sometimes occurs due to excessive light, either natural or unnatural. The glare makes it difficult for the user to see the monitor and will ultimately contribute to mistakes and frustration.

Numerous shading devices have been created in order to solve this problem. Most of these devices do not provide the convertibility or the desired level of securement that is necessary to completely solve this problem. Most of these devices are often bulky, making packaging difficult. Additionally, most of these devices do not provide the ability to be properly secured to the computer monitor in such a way as to prevent the unwanted disengagement therefrom.

The present invention seeks to provide a solution to these problems by providing a simple device that is flat and compact in it's closed orientation to benefit packaging and can be secured around the periphery of the computer monitor and to the front face surrounding the screen so that the securement is sound.

The use of visors for display equipment is known in the prior art. More specifically, visors for display equipment heretofore devised and utilized for the purpose of facilitating the viewing of contents on a display are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,717,566 to Tao discloses a shade device for notebook computer display screens that facilitates viewing in excessive light. U.S. Pat. No. 5,243,463 to Waintroob discloses a visor for a video display terminal having a light absorbing and non-reflecting inner surface that increases visual contrast on the display. U.S. Pat. No. 5,218,474 to Kirschner discloses a video display terminal visor that surrounds the display and is secured thereto around only its periphery. U.S. Pat. No. 5,121,253 to Waintroob discloses a visor for a computer terminal display and method that is also secured to the display around only its periphery. U.S. Pat. No. 5,115,345 to Hobson et al. discloses an anti-glare, antistatic video monitor visor.

While these devices fulfill their respective, particular objective and requirements, the aforementioned patents do not describe a computer screen enhancing device for enhancing images seen through the computer screen by minimizing glare.

In this respect, the computer screen enhancing device according to the present invention substantially departs from the conventional concepts and designs of the prior art, and in doing so provides an apparatus primarily developed for the purpose of enhancing images seen through the computer screen by minimizing glare.

Therefore, it can be appreciated that there exists a continuing need for new and improved computer screen enhancing device which can be used for enhancing images seen through the computer screen by minimizing glare. In this regard, the present invention substantially fulfills this need.

SUMMARY OF THE INVENTION

In the view of the foregoing disadvantages inherent in the known types of visors for display equipment now present in the prior art, the present invention provides an improved computer screen enhancing device. As such, the general purpose of the present invention, which will be described subsequently in greater detail, is to provide a new and improved computer screen enhancing device and method which has all the advantages of the prior art and none of the disadvantages.

To attain this, the present invention essentially comprises a front panel having a generally square configuration. The front panel has a central opening therethrough. The central opening divides the panel into an upper portion, a lower portion, and a pair of side portions. The front panel is positionable on a computer monitor whereby a computer screen of the monitor is visible through the central opening. The upper portion, lower portion, and the pair of side portions each have means for securement to the computer monitor. A pair of side panels are foldably secured to outer edges of the pair of side portions of the front panel. The side panels each have a triangular lower portion and a square upper portion. Each triangular lower portion has an inner edge foldably secured to the outer edge of each of the side portions. Each triangular lower portion has a short upper edge and an angularly disposed long outer edge. Each square upper portion has a lower edge foldably secured to the short upper edge of the triangular lower portion. Each square upper portion has a pair of vertically disposed hook and loop strips disposed on outer surfaces thereof. A top panel is foldably secured to an outer edge of the upper portion of the front panel. The top panel has a generally rectangular configuration defined by a long lower edge, a long upper edge, and short opposed side edges. The long lower edge is foldably secured to the outer edge of the upper portion of the front panel. The top panel has two pairs of horizontally disposed hook and loop strips on an inner surface thereof inwardly of the side edges thereof for mating with the pair of vertically disposed hook and loop strips of the square upper portions of the pair of side panels in a closed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer screen enhancing device which has all the advantages of the prior art visors for display equipment and none of the disadvantages.

It is another object of the present invention to provide a new and improved computer screen enhancing device which may be easily and efficiently manufactured and marketed.

It is a further object of the present invention to provide a new and improved computer screen enhancing device which is of durable and reliable construction.

An even further object of the present invention is to provide a new and improved computer screen enhancing device which is susceptible of a low cost of manufacture with regard to both materials and labor, and which accordingly is then susceptible of low prices of sale to the consuming public, thereby making such a computer screen enhancing device economically available to the buying public.

Even still another object of the present invention is to provide a new and improved computer screen enhancing device for enhancing images seen through the computer screen by minimizing glare.

Lastly, it is an object of the present invention to provide a new and improved computer screen enhancing device including a front panel having a central opening therethrough. The front panel is positionable on a computer monitor whereby a computer screen of the monitor is visible through the central opening. A pair of side panels are foldably secured to outer edges of a pair of side portions of the front panel. The side panels have a pair of vertically disposed hook and loop strips disposed on outer surfaces thereof. A top panel is foldably secured to an outer edge of an upper portion of the front panel. The top panel has two pairs of horizontally disposed hook and loop strips on an inner surface thereof for mating with the pair of vertically disposed hook and loop strips of the pair of side panels in a closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
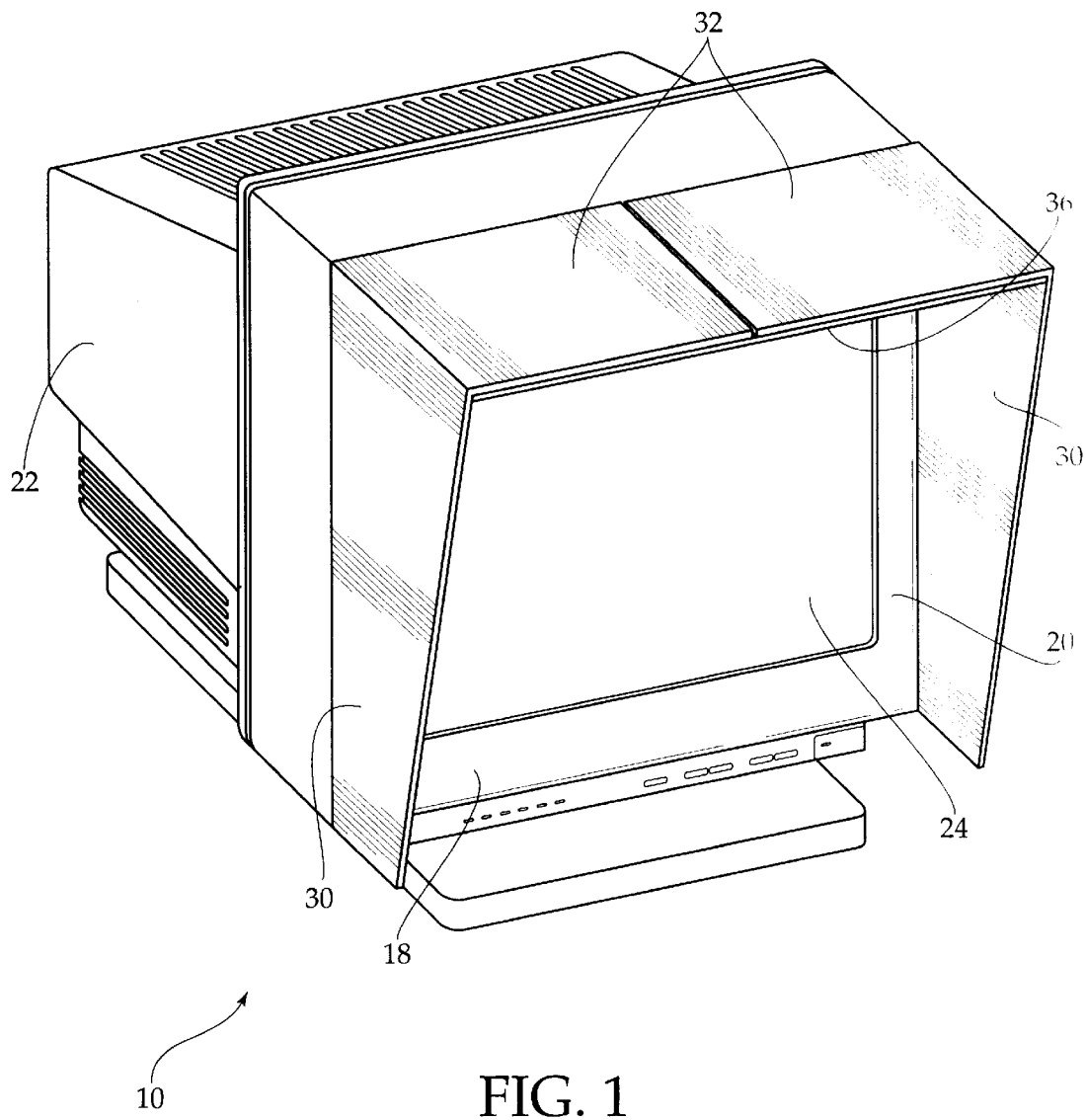
FIG. 1 is a perspective view of the preferred embodiment of the computer screen enhancing device constructed in accordance with the principles of the present invention.
Figure 2:
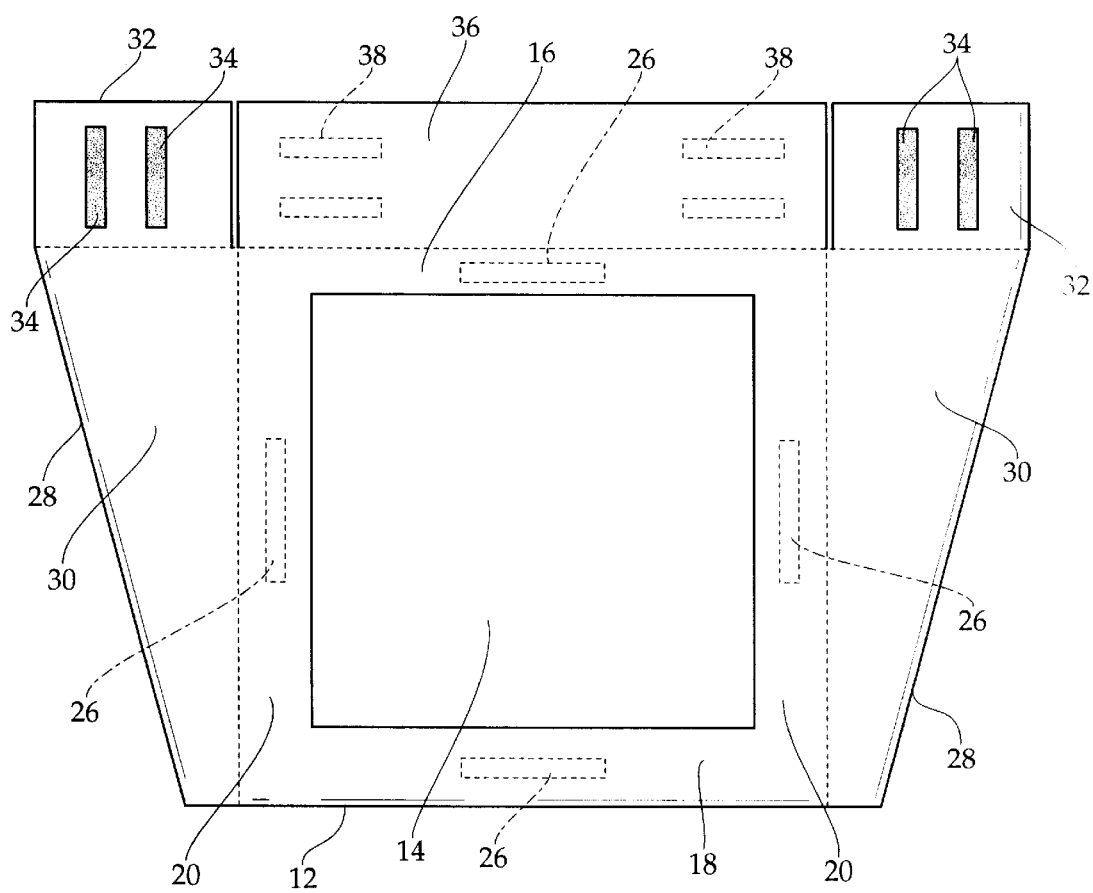
FIG. 2 is a front elevation view of the present invention illustrated in a first open orientation prior to being secured to the display.
Figure 3:
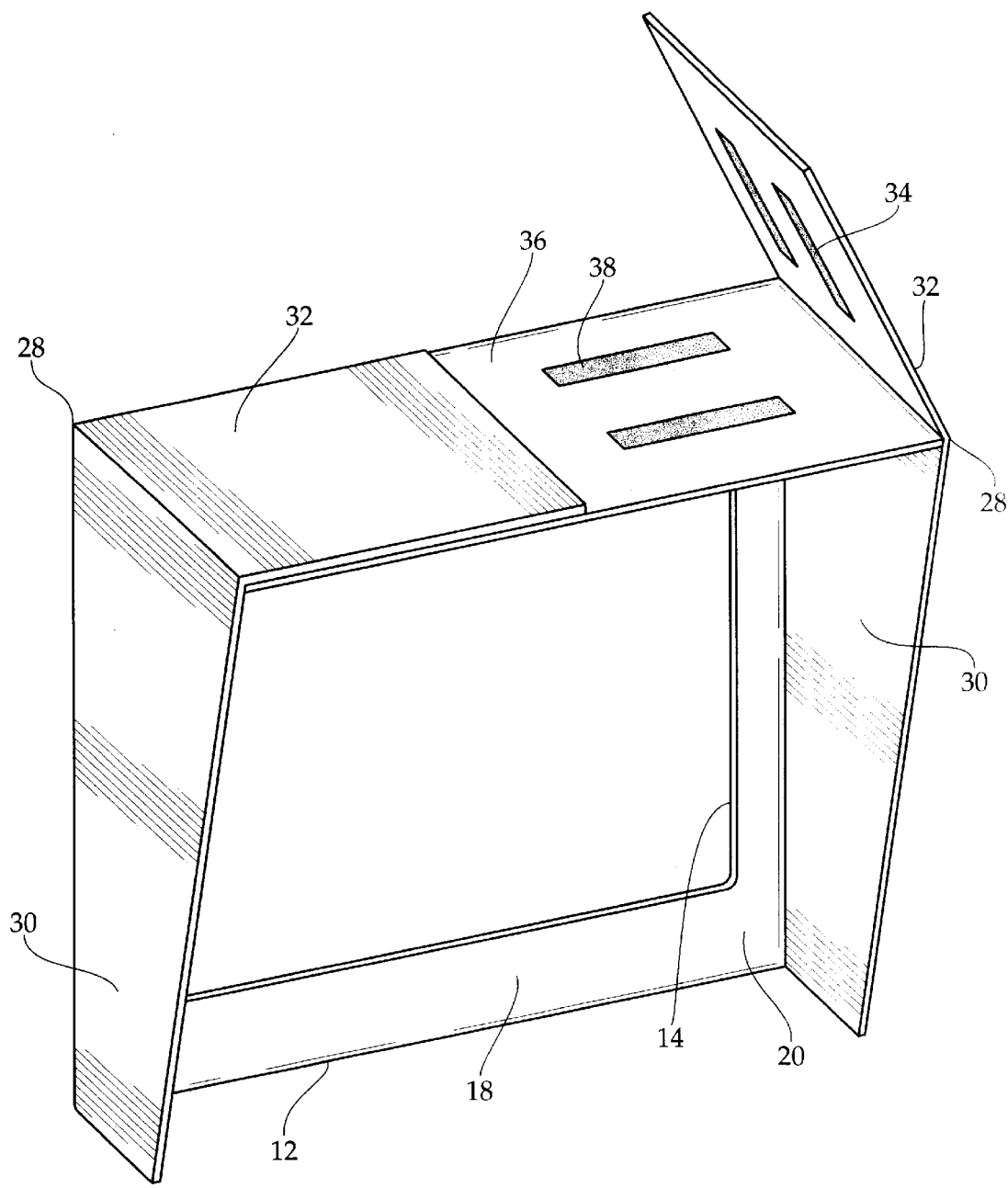
FIG. 3 is a perspective view of the present invention illustrated in a partially closed orientation separated from the display.

With reference now to the drawings, and in particular, to FIGS. 1 through 3 thereof, the preferred embodiment of the new and improved computer screen enhancing device embodying the principles and concepts of the present invention and generally designated by the reference number 10 will be described.

Specifically, it will be noted in the various Figures that the device relates to a computer screen enhancing device for enhancing images seen through the computer screen by minimizing glare. In its broadest context, the device consists of a front panel, a pair of side panels, and a top panel. Such components are individually configured and correlated with respect to each other so as to attain the desired objective.

The front panel 12 has a generally square configuration. The front panel 12 has a central opening 14 therethrough. The central opening 14 divides the front panel 12 into an upper portion 16, a lower portion 18, and a pair of side portions 20. The front panel 12 is positionable on a computer monitor 22 whereby a computer screen 24 of the monitor 22 is visible through the central opening 14. Note FIG. 1. The upper portion 16, lower portion 18, and the pair of side portions 20 each have means 26 for securement to the computer monitor 22. The means of securement 26, as illustrated in FIG. 2, is comprised of strips of either adhesive material for direct securement to the monitor 22, or hook and loop material that will mate with corresponding hook and loop strips that have already been secured to the monitor 22. The use of adhesive material will create a fixed securement to the monitor 22 whereas the use of the hook and loop material will allow the front panel 12 to be removed from the monitor 22 as desired.

The pair of side panels 28 are foldably secured to outer edges of the pair of side portions 20 of the front panel 12. The side panels 28 each have a triangular lower portion 30 and a square upper portion 32. Each triangular lower portion 30 has an inner edge foldably secured to the outer edge of each of the side portions 20. Each triangular upper portion 30 has a short upper edge and an angularly disposed long outer edge. Each square upper portion 32 has a lower edge foldably secured to the short upper edge of the triangular lower portion 30. Each square upper portion 32 has a pair of vertically disposed hook and loop strips 34 disposed on outer surfaces thereof. Once the front panel 12 is secured to the computer monitor 22, the triangular side portions 30 are folded inwardly so that they are essentially co-linear with sides of the monitor 22 with the fold line between the triangular lower portions 30 and the square upper portions 32 positioned at upper corners of the monitor 22 whereby the upper square portions 32 are capable of folding over the top of the monitor 22.

The top panel 36 is foldably secured to an outer edge of the upper portion 16 of the front panel 12. The top panel 36 has a generally rectangular configuration defined by a long lower edge, a long upper edge, and short opposed side edges. The long lower edge is foldably secured to the outer edge of the upper portion 16 of the front panel 12. The top panel 36 has two pairs of horizontally disposed hook and loop strips 38 on an inner surface thereof inwardly of the side edges thereof for mating with the pair of vertically disposed hook and loop strips 34 of the square upper portions 32 of the pair of side panels 28 in a closed orientation. The top panel 36 will fold over the top of the monitor 22 and the hook and loop strips 34,38 of the top panel 36 and the side panels 28 will mate so as to provide a device that will enhance the viewing of the screen 24.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A computer screen enhancing device for enhancing images seen through a computer screen by minimizing glare comprising, in combination:

a front panel having a generally square configuration, the front panel having a central opening therethrough, the central opening dividing the panel into an upper portion, a lower portion, and a pair of side portions, the front panel being positionable on a computer monitor whereby a computer screen of the monitor is visible through the central opening, the upper portion, lower portion, and the pair of side portions each having an outer edge and a means for securement to the computer monitor;

a pair of side panels foldably secured to the outer edges of the pair of side portions of the front panel, the side panels each having a triangular lower portion and a square upper portion, each triangular lower portion having an inner edge foldably secured to the outer edge of each of the side portions, each triangular lower portion having a short upper edge and an angularly disposed long outer edge, each square upper portion having a lower edge foldably secured to the short upper edge of the triangular lower portion, each square upper portion having a pair of vertically disposed hook and loop strips;

a top panel foldably secured to an outer edge of the upper portion of the front panel, the top panel having a generally rectangular configuration defined by a long lower edge, a long upper edge, and short opposed side edges, the long lower edge being foldably secured to the outer edge of the upper portion of the front panel, the top panel having two pairs of horizontally disposed hook and loop strips on an inner surface thereof inwardly of the side edges thereof for mating with the pair of vertically disposed hook and loop strips of the square upper portions of the pair of side panels in a closed orientation.

2. A computer screen enhancing device for enhancing images seen through a computer screen by minimizing glare comprising, in combination:

a front panel having a central opening therethrough, the front panel being positionable on a computer monitor whereby a computer screen of the monitor is visible through the central opening;

a pair of side panels foldably secured to outer edges of side portions of the front panel, the pair of side panels having a pair of vertically disposed hook and loop strips disposed on outer surfaces thereof;

a top panel foldably secured to an outer edge of an upper portion of the front panel, the top panel having two pairs of horizontally disposed hook and loop strips on an inner surface thereof for mating with the pair of vertically disposed hook and loop strips of the side panels in a closed orientation.

3. The computer screen enhancing device as set forth in claim 2 wherein the central opening divides the panel into an upper portion, a lower portion, and a pair of side portions, the upper portion, lower portion, and the pair of side portions each having means for securement to the computer monitor.

4. The computer screen enhancing device as set forth in claim 2 wherein the side panels each have a triangular lower portion and a square upper portion, each triangular lower portion having an inner edge foldably secured to the outer edge of each of the side portions, each triangular lower portion having a short upper edge and an angularly disposed long outer edge.

5. The computer screen enhancing device as set forth in claim 4 wherein each square upper portion has a lower edge foldably secured to the short upper edge of the triangular lower portion, each square upper portion having the pair of vertically disposed hook and loop strips disposed on outer surfaces thereof.

6. The computer screen enhancing device as set forth in claim 2 wherein the top panel has a generally rectangular configuration defined by a long lower edge, a long upper edge, and short opposed side edges, the long lower edge being foldably secured to the outer edge of the upper portion of the front panel, the top panel having the two pairs of horizontally disposed hook and loop strips on an inner surface thereof inwardly of the side edges thereof.

\* \* \* \* \*